US011611259B2

(12) United States Patent
Lambourg et al.

(10) Patent No.: US 11,611,259 B2
(45) Date of Patent: Mar. 21, 2023

(54) SYSTEMS FOR A COOLING JACKET IN AN ELECTRIC MOTOR

(71) Applicant: Dana Belgium N.V., Bruges (BE)

(72) Inventors: Louis Lambourg, Valenciennes (FR); Steven Vanhee, Staden (BE)

(73) Assignee: Dana Belgium N.V., Bruges (BE)

( * ) Notice: Subject to any disclaimer, the term of this patent is extended or adjusted under 35 U.S.C. 154(b) by 317 days.

(21) Appl. No.: 16/810,665

(22) Filed: Mar. 5, 2020

(65) Prior Publication Data

US 2021/0281143 A1  Sep. 9, 2021

(51) Int. Cl.
*H02K 5/20* (2006.01)
*H02K 9/19* (2006.01)
*H02K 1/20* (2006.01)

(52) U.S. Cl.
CPC .............. *H02K 5/203* (2021.01); *H02K 1/20* (2013.01); *H02K 9/19* (2013.01)

(58) Field of Classification Search
CPC .......... H02K 9/19; H02K 9/193; H02K 9/197; H02K 5/20; H02K 5/203; H02K 5/207; H02K 2213/03
See application file for complete search history.

(56) References Cited

U.S. PATENT DOCUMENTS

| | | | |
|---|---|---|---|
| 2,862,120 A | 11/1958 | Onsrud | |
| 5,289,871 A * | 3/1994 | Leidinger | F28D 7/08 165/41 |
| 7,009,317 B2 | 3/2006 | Cronin et al. | |
| 7,633,194 B2 | 12/2009 | Dawsey et al. | |
| 7,675,209 B2 | 3/2010 | Masoudipour et al. | |
| 9,207,022 B2 | 12/2015 | Sheu et al. | |
| 2008/0185924 A1 | 8/2008 | Masoudipour et al. | |
| 2012/0217826 A1 * | 8/2012 | Jiang | H02K 5/20 165/170 |
| 2015/0130302 A1 * | 5/2015 | Leberle | H02K 9/197 310/54 |
| 2017/0141653 A1 | 5/2017 | Okazaki et al. | |
| 2019/0280536 A1 * | 9/2019 | Niijima | H02K 5/203 |
| 2021/0234416 A1 * | 7/2021 | Murakami | H02K 9/197 |
| 2021/0242748 A1 * | 8/2021 | Wong | H02K 9/19 |

FOREIGN PATENT DOCUMENTS

| | | | |
|---|---|---|---|
| CN | 105264752 A | 1/2016 | |
| WO | WO-2021115895 A1 * | 6/2021 | H02K 5/203 |

OTHER PUBLICATIONS

Machine Translation of WO 2021/115895 A1 (Year: 2021).*

* cited by examiner

*Primary Examiner* — Ahmed Elnakib
*Assistant Examiner* — Christopher S Leone
(74) *Attorney, Agent, or Firm* — McCoy Russell LLP

(57) ABSTRACT

Methods and systems are provided for a cooling jacket for an electric motor. In one example, a system may include a channel extending along a circumference of an inner surface of the cooling jacket between an inlet and an outlet of the cooling jacket. A cross-section of the channel may gradually change from the inlet to the outlet along the circumference in order to compensate an increase in coolant temperature by an increase in convective heat transfer such that cooling is balanced around a circumferential surface of the electric motor.

15 Claims, 7 Drawing Sheets

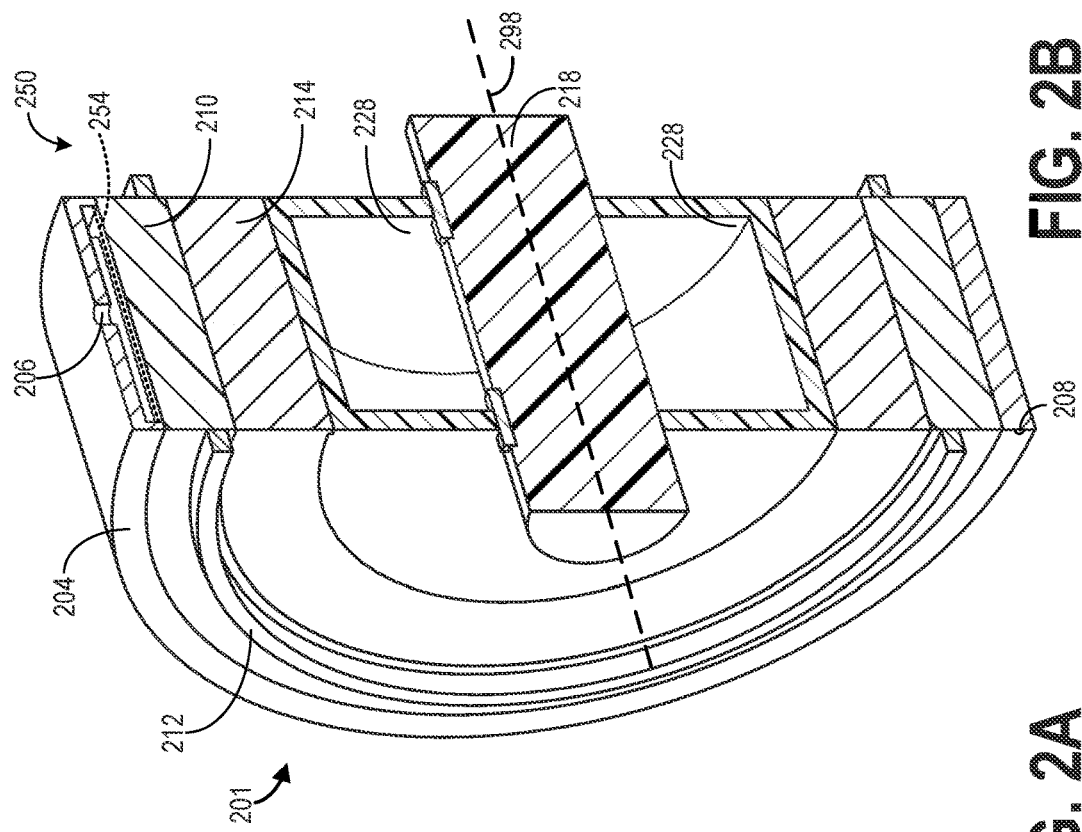
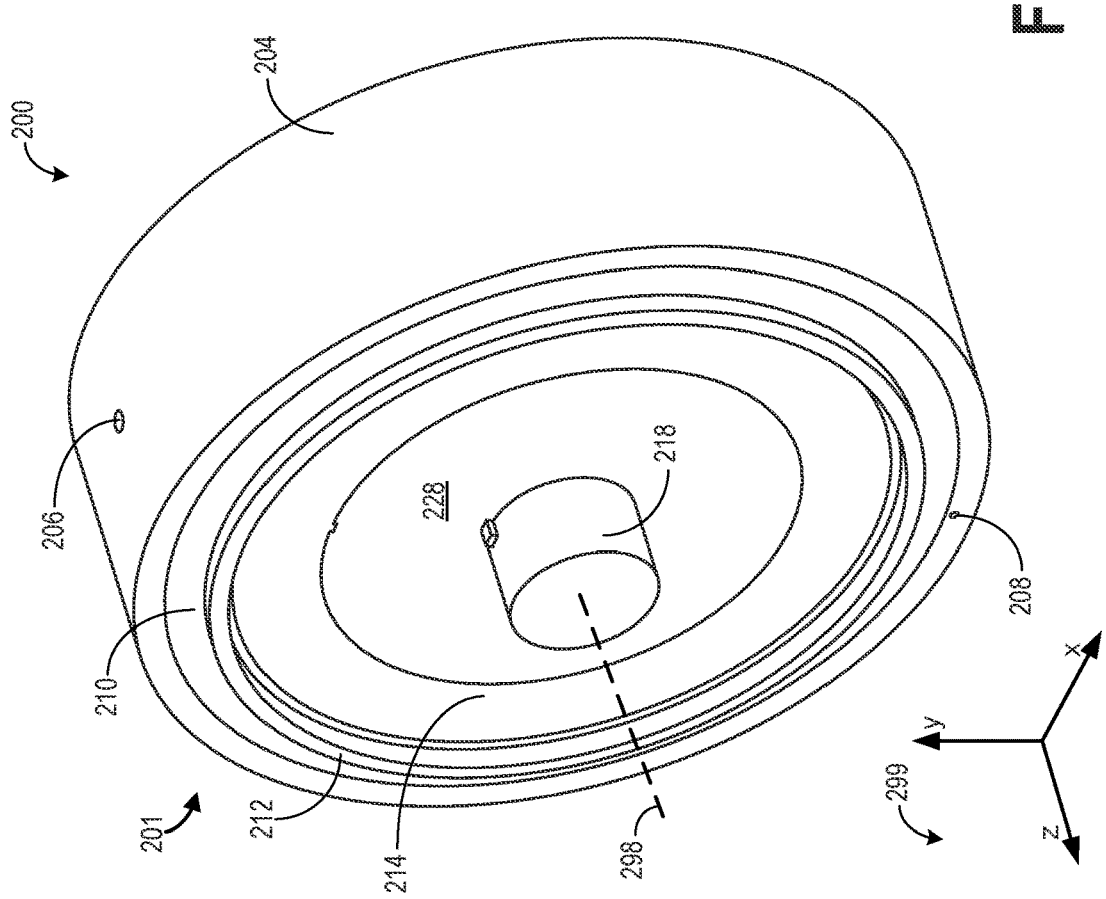
FIG. 2A
FIG. 2B

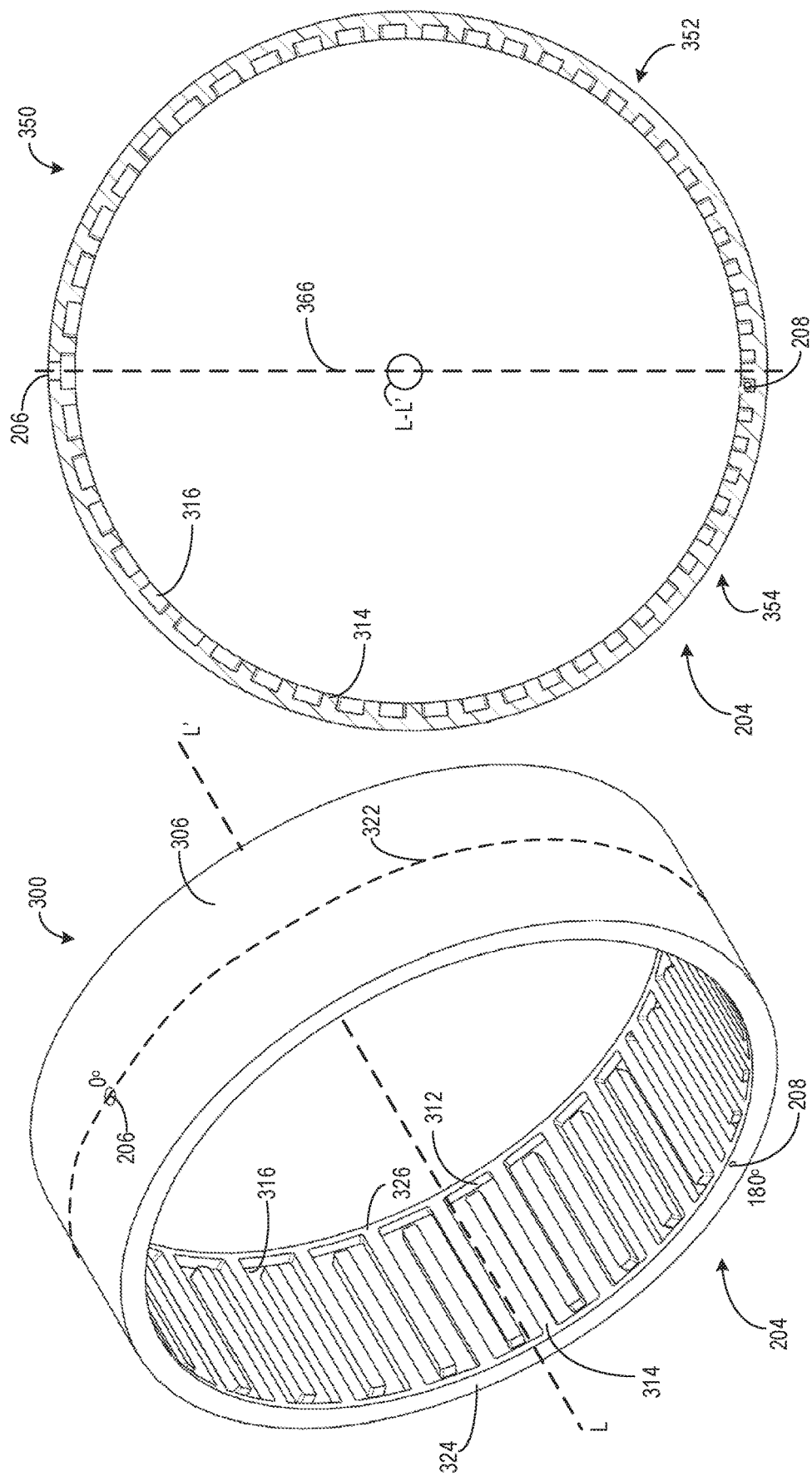

SYSTEMS FOR A COOLING JACKET IN AN ELECTRIC MOTOR

TECHNICAL FIELD

The present description relates generally to systems for a cooling jacket providing uniform cooling of an electric motor.

BACKGROUND & SUMMARY

An electric motor may be operated to produce torque about a shaft by converting electrical energy into mechanical energy via an interaction between a rotor and a stator. For example, providing electrical power to an electric motor may produce an electromagnetic field, which may cause a rotor (e.g., an element free to move about an axis) to turn relative to a stator (e.g., an element held stationary). In some examples, the rotor may include permanent magnets and/or magnetic coil windings in order to generate a magnetic field, and the stator may carry a current that interacts with the magnetic field of the rotor. In some examples, an electric motor may be used to drive a load. For example, an electric motor may be integrated into a vehicle system, and may be used to partially or completely power the vehicle. As another example, an electric motor may operate as a generator, and may be coupled to a power storage device. During operation of the electric motor, temperature of electric motor components such as the stator and the rotor may increase.

Various approaches are provided for cooling components of an electric motor. In one example, as shown in U.S. Patent Application No. 2008/0185924, Masoudipour et al. teaches a cooling jacket of an electric motor or generator including a cylindrical inner sleeve, a cylindrical outer sleeve coaxially surrounding the inner sleeve and forming a circular space between the outer sleeve and the inner sleeve, and a passageway extending within the circular space between the outer sleeve and the inner sleeve. The passageway having a uniform cross-section may be a continuous winding path that may extend axially back and forth along the circumference of said inner sleeve. A cooling liquid may flow through the passageway recovering heat from the components of the electric motor or generator.

However, the inventors herein have recognized potential issues with such systems. As one example, as the cooling liquid passes through the winding passageway, heat transferred to the cooling liquid from the heated motor components may cause the temperature of the cooling liquid to increase. An increase in temperature of the cooling liquid may cause a reduction in efficiency of the cooling liquid to further extract heat from the heated motor components as the cooling liquid travels from one end of the passageway to another resulting in non-uniform cooling of motor components. As an example, motor components closer to the inlet of the passageway may be cooled to a higher extent relative to motor components located further away from the inlet. Non-uniform cooling may cause a heat gradient and hot spots in the electric motor which may cause degradation of the components and reduce their efficiency of operation.

In one example, the issues described above may be addressed by a system for a cooling jacket of an electric motor, comprising: a channel extending along a circumference of an inner surface of the cooling jacket between an inlet and an outlet, a cross-section of the channel gradually changing from the inlet to the outlet along the circumference. In this way, by adjusting a width or a height of cooling channels over the course of the cooling jacket, a uniform cooling of all motor components may be attained.

As one example, a cylindrical cooling jacket may coaxially surround the stator of an electric motor. The single-piece cooling jacket may include a housing and a continuous channel formed on an inner side of the housing. The meandering channel may extend axially back and forth along the circumference of the inner side around finger like projections such that a cooling liquid may flow through the channel in axial directions proximal to the stator. The cooling liquid may enter the channel via a single inlet located at a top part of the jacket and the liquid may split in half and flow towards opposite sides of the jacket. The jacket may include one or more outlets, located diametrically opposite to the inlet, via which the cooling liquid may exit the jacket. The channel width (cross-section) may change continually from the inlet to the outlet over the perimeter of the jacket. The distance between two consecutive finger like projections may decrease towards the outlet of the channel causing the width of the channel to decrease gradually from the inlet to the outlet over the perimeter of the jacket. Due to the change in the width of the channel over the course of the cooling jacket, a velocity of cooling liquid flowing through the channel may be higher proximal to the outlet of the channel relative to that proximal to the inlet. In other embodiments, the channel height (cross-section) may vary continually from the inlet to the outlet over the perimeter of the jacket.

In this way, by changing a width or a height of a cooling channel over the perimeter of a cylindrical cooling jacket, a uniform cooling may be attained for all areas of the motor component surrounded by the cooling jacket. Due to the increase in the velocity of cooling liquid flowing through the cooling channel proximal to the outlet of the channel, even though the cooling liquid may be at a higher temperature due to accumulation of transferred heat, a higher degree of heat transfer via convection may take place from the hot motor component to the circulating cooling liquid. The technical effect of maintaining a desired heat transfer from the motor components to the cooling liquid all over the cooling jacket is that a uniform temperature across the circumferential surface of the stator of the motor may be attained, thereby improving motor functionality and reducing degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows a perspective view of the electric motor including a cooling jacket.

FIG. 2B shows a perspective view of a cross-section of the electric motor including the cooling jacket.

FIG. 3A shows a perspective view of the cooling jacket of FIGS. 2A-B.

FIG. 3B shows a cross-sectional view of the cooling jacket.

FIGS. 2A-5B are shown approximately to scale.

DETAILED DESCRIPTION

Figure 1:
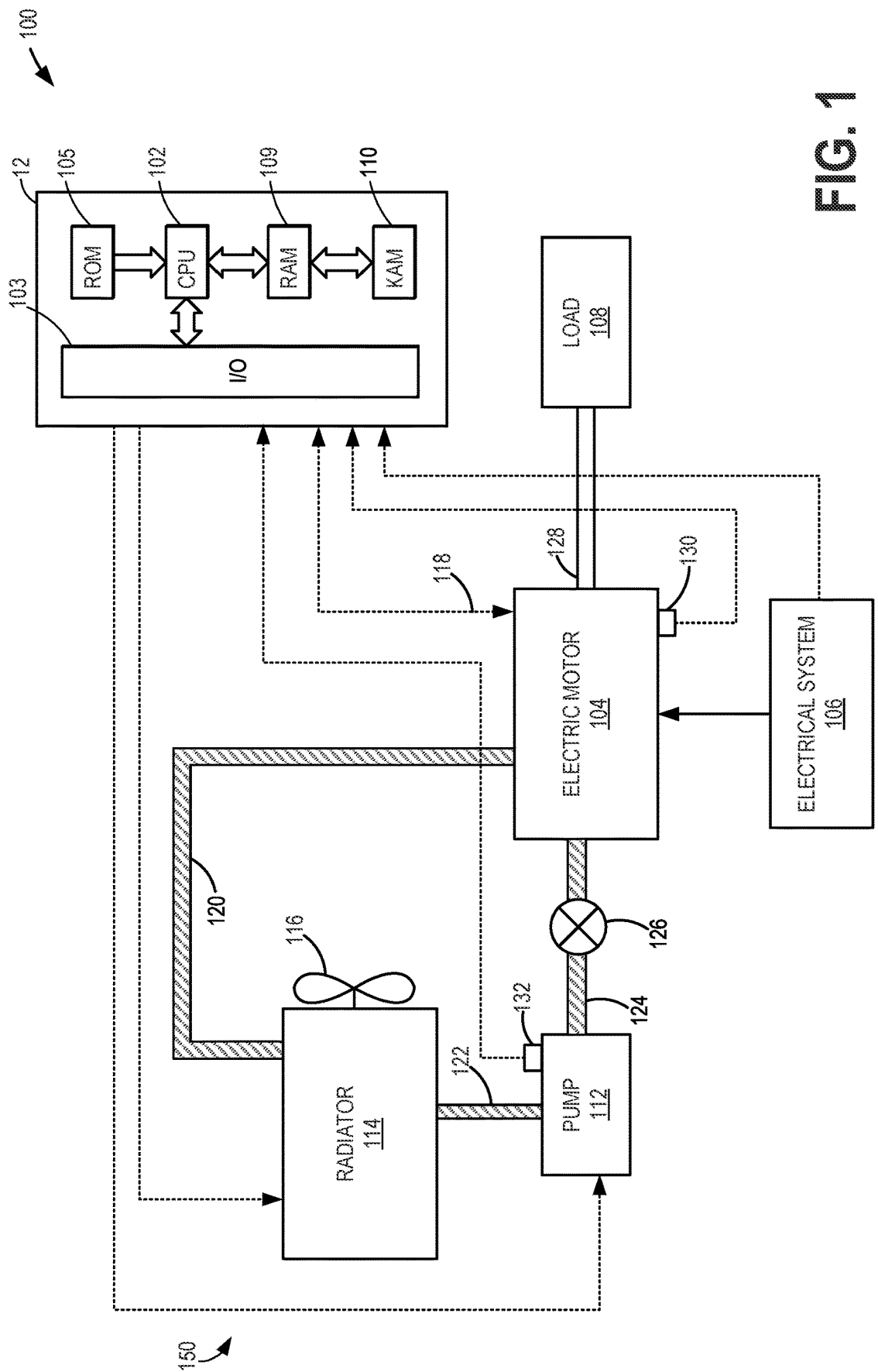
FIG. 1 shows an example cooling system coupled to an electric motor.

The following description relates to systems for a cooling jacket providing uniform cooling of components of an electric motor. An example electric motor may be coupled to a cooling system, as shown in FIG. 1 for heat dissipation during operation. A cooling jacket may surround the perimeter of a stator of the electric motor, as shown in FIGS. 2A-B. FIGS. 3A, B-5A, B show a plurality of views of the cooling jacket isolated from the electric motor. The cylindrical cooling jacket in an unwrapped form may be seen in FIG. 6. A comparative plot of temperature profiles across two separate cooling jackets of two different embodiments are shown in FIG. 7.

FIG. 1 shows an example system 100 including an electric motor and an oil cooling system for cooling the electric motor. As depicted, system 100 includes an electric motor 104, which may be an AC or DC motor that generates torque about a shaft 128 via manipulating an electromagnetic field. Electric motor 104 may be powered by an electrical system 106. In some examples, electrical system 106 may be a battery, an electrical outlet, a generator, or any other suitable source of electrical current. Further, electrical motor 104 may drive a load 108 via shaft 128. In some examples, shaft 128 may be directly coupled to load 108, while in other examples shaft 128 may not be directly coupled to load 108. In some examples, a velocity of electric motor 104 may be controlled by a controller 12.

As depicted in FIG. 1, motor system 100 may further include a cooling system 150, which may provide cooling to electric motor 104 in order to decrease a temperature of electric motor 104 during operation. The cooling system 150 may circulate a cooling liquid through the electric motor 104 to absorb waste heat and distribute the heated cooling liquid to a heat exchanger, such as a radiator 114 (e.g., a radiator heat exchanger). In one example, the cooling liquid may be a dielectric fluid such as oil. In other examples, the cooling liquid may be another suitable dielectric fluid in case of direct contact with the stator circumferential surface. In yet other examples, the cooling liquid may be an electrically conductive fluid such as antifreeze (e.g., a water-glycol mixture), in case the fluid is not in direct contact with any other element of the electric motor except a cooling jacket itself. The cooling liquid may be circulated via the cooling jacket surrounding the periphery (and in face sharing contact with the motor) of the motor.

The cylindrical cooling jacket may include a continuous channel disposed on an inner surface meandering about interdigitated fingers projecting from sidewalls of the inner surface, the channel including a variable cross-section with the cross-section decreasing along each of a first half and a second half of the cooling jacket from a top of the cooling jacket to a bottom of the cooling jacket. More details on the cooling jacket will be presented in FIGS. 2A-B and 3A-B. The cooling liquid may enter the channel from an opening located at the top of the jacket and after flowing through the channel in each of the first half and the second half of the cooling jacket, the cooling liquid may exit the channel through one or more openings located at the bottom of the cooling jacket, the top and the bottom of the cooling jacket having an angular separation of 180°.

A fan 116 may be coupled to the radiator 114 in order to maintain an airflow through the radiator 114. In some examples, fan velocity may be controlled by the controller 12. The cooling liquid that is cooled by the radiator 114 may enter a tank (not shown). The cooling liquid (also referred herein as coolant) may then be pumped by a coolant pump 112 back to the electric motor or to another component of the system. Further, a position of a coolant valve 126 may determine whether coolant flows from pump 112 to electric motor 104, such that coolant may only flow from pump 112 to electric motor 104 when coolant valve 126 is in an open position, and may not flow from pump 112 to electric motor 104 when coolant valve 126 is in a closed position. The position of coolant valve 126 may be controlled by controller 12.

As shown in FIG. 1, coolant may flow from radiator 114 to pump 112 via coolant pipe 122; coolant may flow from pump 112 to electric motor 104 via coolant pipe 124 when valve 126 is open; coolant may flow from a coolant sump of electric motor 104 back to radiator 114 via a coolant pipe 120. When coolant returns to radiator 114, the radiator may reduce a temperature of the coolant before recirculation.

The controller 12 is shown in FIG. 1 as a microcomputer, including a microprocessor unit 102, input/output ports 103, an electronic storage medium for executable programs and calibration values shown as read only memory chip 105 in this particular example, random access memory 109, keep alive memory 110, and a data bus. Controller 12 may receive various signals 118 from sensors coupled to electric motor 104 and other components of motor system 100, including the signals previously discussed and additionally including a measurement of a coolant temperature from a temperature sensor 132 coupled to pump 112; and a motor temperature from a temperature sensor 130 coupled to electric motor 104. Controller 12 may infer a motor temperature based on the motor coolant temperature.

Turning to FIG. 2A-B, a detailed view of electric motor 104 is shown. FIG. 2A shows a perspective view 200 of an electric motor including a cooling jacket and FIG. 2B shows a cross-sectional view 250 of the electric motor including the cooling jacket. The electric motor may include a rotor, a stator, and a rotor shaft, such that the electric motor may be used similarly to electric motor 104 of FIG. 1, and may be included as the electric motor in FIG. 1 in some examples. The central axis 298 of rotation of the electric motor may be parallel with the z axis of reference axes 299. Further, the cross-sectional view 250 of FIG. 2B is defined by an axial cut in the y-z plane, as indicated by reference axes 299, in order to show an interior of electric motor 201 is shown. The axial cut plane may include axis 298, so that the axial cut plane bisects electric motor 201.

As shown, electric motor 201 comprises a rotor 214, a stator 210, and a rotor shaft 218. Stator 210 is a stationary component of electric motor 201 with end windings 212. Stator 210 may be a hollow tube encasing other components of electric motor, and may not rotate during motor operation, in order to deliver mechanical power to the load coupled thereto. Rotor 214 is a hollow tube concentric with stator 210, sized such that the outer radius of rotor 214 is smaller than the inner radius of stator 210, so that rotor is contained entirely inside stator 210. Rotor 214 is fixedly mounted to a rotor hub 228. A central axis of each of rotor 214, stator 210, rotor hub 228, and rotor shaft 218 may be collinear with axis 298. Further, rotor hub 228 is fixedly mounted to the rotor shaft 218, such that rotor rotation may directly cause rotor hub 228 and rotor shaft 218 to rotate about central axis 298.

A cooling jacket 204 may coaxially surround (enclose) the electric motor 201 components including the rotor 214, the stator 210, and the rotor shaft 218. In one example, the cooling jacket 204 may be in face sharing contact with the stator 210. The cooling jacket may include a channel forming an interlocking ring along a circumference of an inner surface, the inner surface proximal to the stator 210. A cooling liquid may enter the cooling jacket via an inlet 206 positioned at a top portion of the cooling jacket 204 and then the cooling liquid may circulate throughout the cylindrical cooling jacket via the channel. The cooling liquid may exit the cooling jacket via an outlet 208 positioned diametrically opposite to the inlet 206. A cross-section of the channel may gradually decrease between the inlet 206 and the outlet 208 over each half of the cooling jacket.

In another example, the cooling jacket 204 may not be in face sharing contact with the stator 210. An aluminum sleeve 254 (represented by a dotted line in FIG. 2B) may optionally be present between the stator 210 and the channel of the cooling jacket 204, such that the cooling liquid does not come in contact with the stator 210. A non-dielectric fluid may be used as a cooling liquid in this case. The non-dielectric fluid will be totally enclosed in the cooling jacket 204 from the inlet to the outlet(s), such that there is no direct contact of the fluid with any part of the electric motor except for the cooling jacket itself.

During operation of the electric motor 201, components of the motor may be heated and to reduce the possibility of overheating and hot spot formation, a cooling liquid may be routed through the cooling jacket enclosing the electric motor to absorb the heat from the electric motor components. As the cooling liquid flows from the inlet to the outlet, heat from the electric motor components such as the stator 210 may be conducted to the cooling liquid. As heat is collected by the cooling liquid, the temperature of the cooling liquid may increase which may adversely affect the capability of the cooling liquid to further absorb heat away from the inlet. Hence the cross-section of the channel is reduced towards the outlet (where the temperature of the cooling liquid is higher) such that the velocity of the cooling liquid increases as it flows from the inlet towards the outlet. An increased velocity of the cooling liquid may ensure an efficient heat transfer from the stator to the cooling liquid, thereby compensating for the temperature increase.

FIG. 3A shows a perspective view 300 of the cooling jacket 204 of FIGS. 2A-B. As previously elaborated, the cooling jacket 204 may enclose the electric motor. The cooling jacket 204 may include an outer housing 306 and an inner surface 312. The inner surface 312 may be in face sharing contact with a stator of the electric motor that is being cooled. The cooling jacket may be shaped as a hollow cylinder with an axis L-L' may pass laterally through the center of the cooling jacket 204 (central axis of the cylinder).

A channel 316 may be formed along the wall of the inner surface 312 with the channel 316 running axially back and forth from a first side wall 324 to a second side wall 326 of the inner surface 312 along the L-L' axis. The channel 316 may be a single continuous passage meandering about a plurality of finger-like projections 314 disposed on the inner surface 312 in an interlocked manner. A first set of finger-like projections (also referred herein as fingers) may be attached to the first side wall 324 and may project towards the second side-wall 326 while a second set of finger-like projections may be attached to the second side wall 326 and may project towards the first side-wall 324. The first set of finger-like projections may alternate with the second set of finger-like projections with a first finger belonging to the first set being adjacent to a second finger belonging to the second set which in turn may be adjacent to a third finger belonging to the first set. In this way, a finger from the first set of finger-like projections may have fingers from the second set of finger-like projections on either side while a finger from the second set of finger-like projections may have fingers from the first set of finger-like projections on either side.

An inlet 206 of the channel may be located at a top of the cooling jacket 204 (say corresponding to 0° position) via which a cooling liquid may enter the passage 316. An outlet 208 of the channel may be located at a bottom of the cooling jacket 204 (say corresponding to 180° position), diametrically opposite to the inlet 206. The cooling fluid may include a dielectric fluid such as oil.

The interdigitated fingers traverse the channel 316 and the distance between two consecutive fingers govern the width (cross-section) of the channel 316. As would be further elaborated with respect to FIGS. 3B and 5A, the width of the channel 316 may change over the course of the perimeter of the inner surface 312 with the width of the channel 316 being highest proximal to the inlet 206 and the width of the channel 316 being lowest proximal to the outlet 208. The width of the channel 316 may decrease in multiple installments from 0° position to the 180° position of the inner surface 312. In one example, the distance between two consecutive fingers 314 may be gradually decreased in order to reduce the width of the channel 316 passing between two fingers. In a different embodiment (not shown), channel height between two consecutive fingers, instead of channel width, may vary continually from the inlet to the outlet over the perimeter of the jacket.

FIG. 3B shows a cross-sectional view 350 of the cooling jacket 204 of FIG. 3A taken along the dotted line 322. Since the cooling jacket 204 is a cylindrical element, the cross-section taken along the line 322 may be circular. The cross-sectional view shows cross sections of the channel 316 between plurality of fingers 314. The inlet 206 of the channel 316 may be located at the top of the cooling jacket 204, the position of the inlet 206 defined as 0° of the circular cross-section. The cooling liquid (such as oil) may enter the cooling jacket 204 via the inlet 206 and then bifurcate in two. A first portion (half) of the cooling liquid may flow through a first half 352 of the cooling jacket 204 while a second portion (other half) of the cooling liquid may flow through a second half 354 of the cooling jacket 204. The cooling liquid may exit the cooling jacket through one or more outlets 208 positioned diametrically opposite to the inlet 206 (such as corresponding to 180° of the circular cross-section). In one example, the cooling liquid flowing through the first half 352 of the cooling jacket 204 may merge with the cooling liquid flowing through the second half 354 of the cooling jacket 204 at the outlet 208 and exit the cooling jacket as a single flow of cooling liquid. In another example, the cooling liquid flowing through the first half 352 of the cooling jacket 204 may not merge with the cooling liquid flowing through the second half 354 of the cooling jacket 204 at the outlet 208 and the two separate flows exit the cooling jacket via separate outlets. The first half 352 of the cooling jacket 204 is symmetric around a vertical axis 366. The second half 354 of the cooling jacket 204 is also symmetric around the vertical axis 366. The details of the channel 316 and the interlocked fingers 314 is discussed further in FIG. 5A which shows the second half 354 of the cooling jacket 204. The features described for the second half is symmetrically positioned and identically shaped and sized for the first half 352 (not shown in FIG. 5A).

Figure 4A:
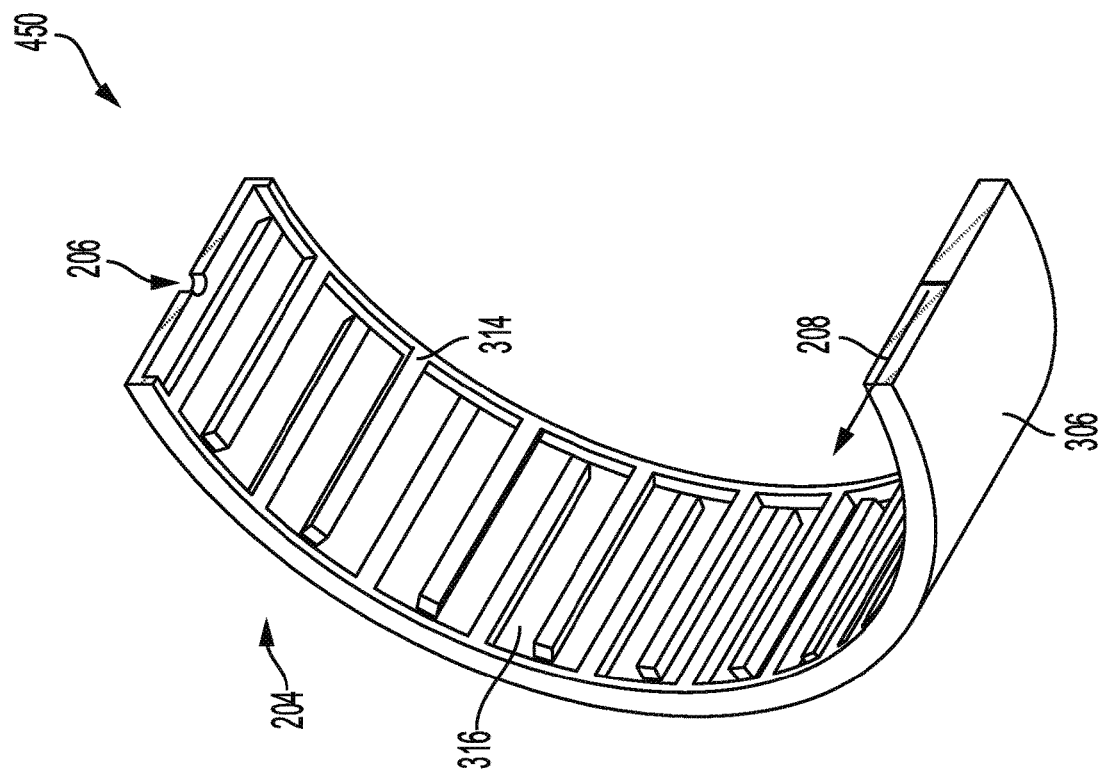
FIG. 4A shows a first perspective view of one half of the cooling jacket.
Figure 4B:
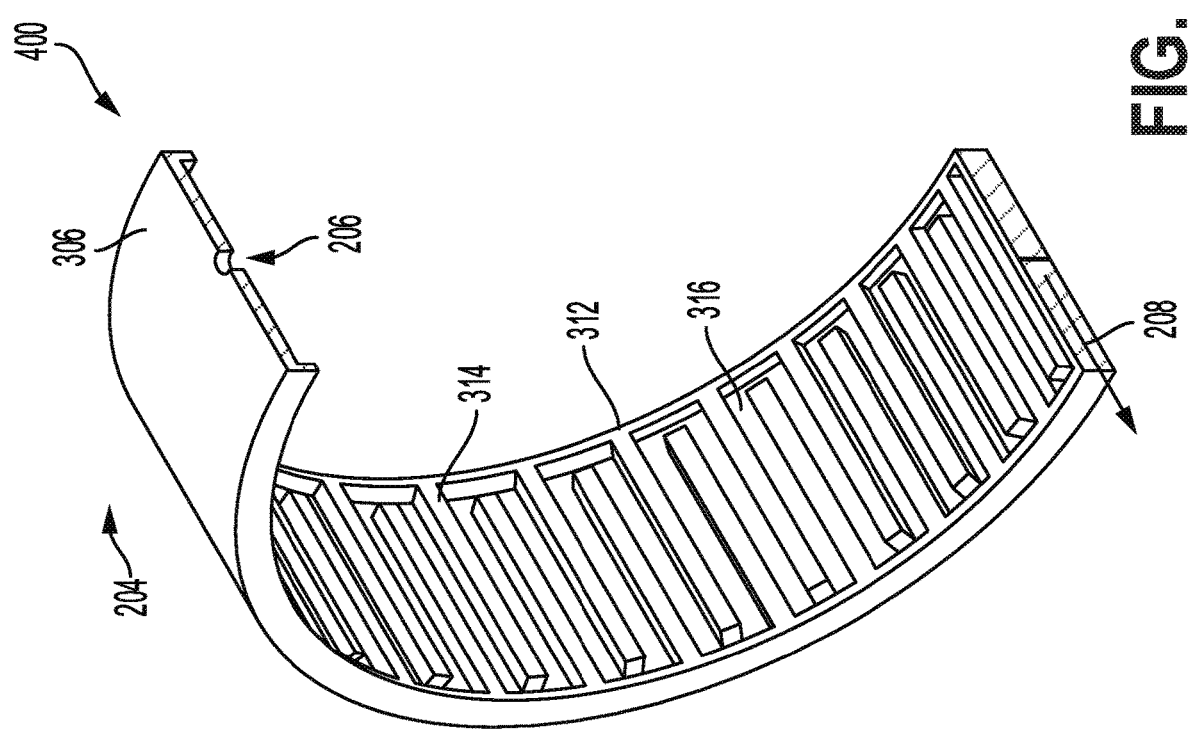
FIG. 4B shows a second perspective view of one half of the cooling jacket.

FIGS. 4A-B show a first view 400 and a second perspective view 450, respectively, of one half of the cooling jacket 204 of FIGS. 3A-B. The one half of the cooling jacket 204 may be the second half 354 of the full cooling jacket 204 as shown in FIG. 3B. Components introduced previously are numbered similarly and not reintroduced.

The cooling jacket 204 may include a housing 306 shielding an inner surface 312. The circumference of the inner surface which is in face sharing contact or is proximal to the electric motor (such as a stator of the electric motor) includes a serpentine channel 316 carrying cooling liquid. Interdigitated finger-like projections 314 line the circumference of the inner surface 312 along the channel 316. The channel 316 may be divided into a plurality of segments and in each segment, the channel 316 may be sandwiched by two fingers 314. The width of the channel 316 may be defined by the distance between two adjacent fingers. As an example, the distance between two fingers 314 may be decreased in multiple installments to gradually reduce the width of the channel 316.

Figure 5B:
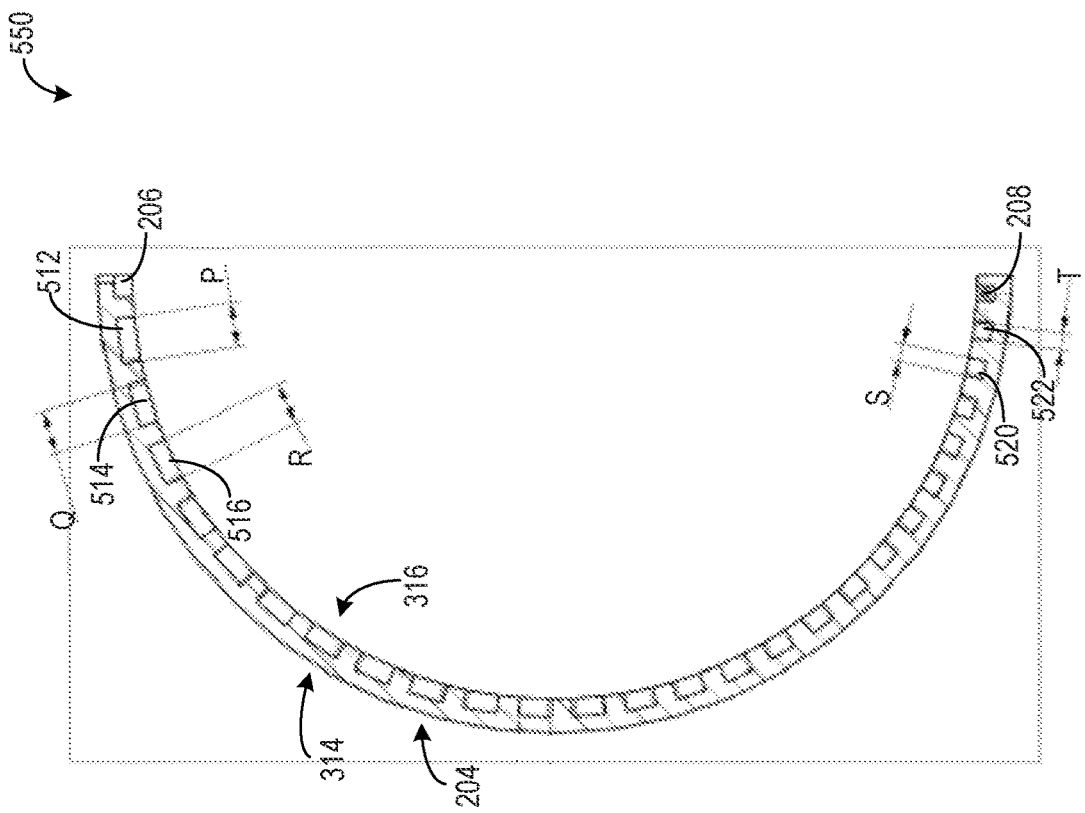
FIG. 5B shows a cross-sectional view of one half of the cooling jacket.
Figure 5A:
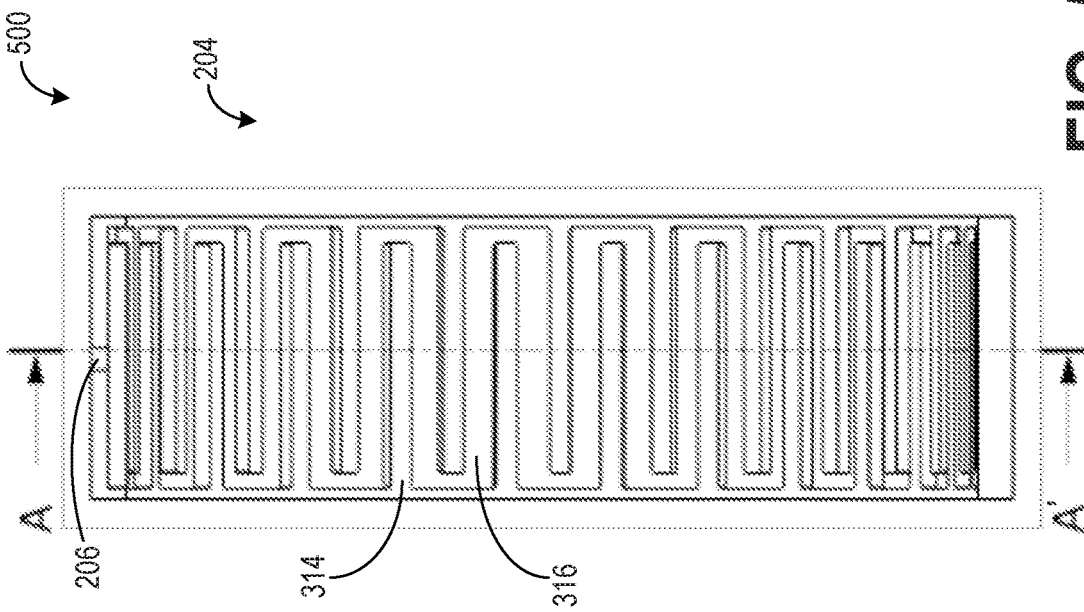
FIG. 5A shows a side view of one half of the cooling jacket.

FIG. 5A shows a side view 500 of one half of the cooling jacket 204 of FIGS. 3A-B. FIG. 5B shows a cross-sectional view 550 of the half of the cooling jacket 204 of FIG. 5A, wherein the cross-section is taken along the A-A' axis. The one half of the cooling jacket 204 may be the second half 354 of the full cooling jacket 204 as shown in FIG. 3B. Components introduced previously are numbered similarly and not reintroduced.

The inlet 206 of the channel 316 may be located at the top of the cooling jacket 204, the position of the inlet 206 defined as 0° of the circular cross-section. The cooling liquid may exit the cooling jacket through one or more outlets 208 positioned diametrically opposite to the inlet 206 (such as corresponding to 180° of the circular cross-section). The channel 316 may be divided into plurality of segments of varying width with each segment being defined as a region of the channel between two consecutive finger-like projections 314. The cross-section of each segment of the channel 316 is shown in FIG. 5B. In this example, 26 segments of the channel are shown between 26 finger-like projections in one half of the cooling jacket 204. In other embodiments, there may be any number of channel segments sandwiched between an equal number of finger-like projections.

The width of a first segment 512 of the channel is referred to as P. The width of a second segment 514 of the channel is referred to as Q. The width of a third segment 516 of the channel is referred to as R. The width of a penultimate segment 520 of the channel is referred to as S. The width of a last segment 522 of the channel is referred to as T.

The width P of the first segment 512 of the channel 316 which is adjacent to the inlet 206 may be the highest while the width T of the last segment 522 adjacent to the outlet 208 being the lowest, the width of the channel segments decreasing in a plurality of installments from the first segment 512 to the last segment 522. The width Q of the second segment 514 may be lower than the width P of the first segment 512. The width R of the third segment 516 may be lower than the widths P and Q of each of the first segment 512 and the second segment 514, respectively. In this way, the width of the channel segments keeps decreasing in increments. The width S of the penultimate channel segment 520 may be lower than all other channels except for the last channel segment 522, the last channel segment 522 having the smallest width T. The exact same change in cooling channel width is mirrored in the other half of the cooling jacket.

As the cooling liquid flows from the inlet towards the outlet via the two sides, heat from the electric motor components may be transferred to the cooling liquid causing the temperature of the cooling liquid to increase. The heat transfer from the electric motor to the cooling liquid is higher when the temperature of the cooling liquid is lower (such that the difference in temperature between the electric motor component and the cooling liquid is higher). Due to heat transfer from the heated surface to the cooling liquid, the temperature of the cooling liquid progressively increases as the cooling liquid travels from the inlet 206 to the outlet 208 via any half of the cylindrical cooling jacket. As the width of the channel segments decrease (from the inlet to the outlet), the velocity of the cooling liquid flowing through the channel segments increases, the velocity of liquid flow through a channel segment being inversely proportional to its width. Therefore, the velocity of cooling liquid flowing through the final segment 522 is higher than the velocity of cooling liquid flowing through the first segment 512. Due to the increase in velocity of the cooling liquid, the efficiency of heat transfer of the cooling liquid increases as the liquid flows towards the outlet. In this way, the reduction in the efficiency of heat transfer of the cooling liquid caused by an increase in temperature of the cooling liquid as it flows from the inlet 206 to the outlet 208 is compensated by an increase in velocity of the cooling liquid as it flows from the inlet 206 to the outlet 208. By ensuring uniform heat extraction along the entire perimeter of the cooling jacket, uniform cooling of the electric motor component (in face sharing contact with the cooling jacket) may be ensured. Due to the uniform cooling of the electric motor component, hot spots on the motor may be reduced and a balanced cooling may be attained, thereby reducing the possibility of degradation of the electric motor.

The uniform cooling of a stator of an electric motor surrounded by the cooling jacket of FIG. 3A is graphically shown in FIG. 7. FIG. 7 shows example plots 700 of temperature profiles of cooling jackets of a first embodiment and a second embodiment. The first embodiment (represented by line 702) may correspond to the cooling jacket described herein with relation to FIG. 3A. In the first embodiment, the width of the cooling channel gradually decreases from the inlet (corresponding to a 0° angular position) to the outlet (corresponding to a 180° angular position) over one half of the cooling jacket. The second embodiment (represented by dashed line 704) may correspond to a cooling jacket which is similar in shape, form, and size to that of the first embodiment except that in the second embodiment, the width of the cooling channel remains equal throughout the cooling jacket. Therefore, the difference between the first embodiment and the second embodiment is that, the width of the channel through which the cooling liquid flows reduces progressively from the 0° angular position and the 180° angular position in the first embodiment while the width of the channel though which the cooling liquid flows remains unchanged between the 0° angular position and the 180° angular position in the second embodiment. The cooling jackets may encircle a cylindrical stator of the electric motor.

The x-axis denotes angular position (in degrees) of the stator enclosed by a cooling jacket and the y-axis denotes temperature of the stator. Line 702 corresponds to a change in temperature over the perimeter of the stator from a 0° angular position to a 180° angular position with the stator enclosed by a first embodiment of the cooling jacket, wherein the channel width decreases from the inlet to the outlet. Dashed line 704 corresponds to a change in temperature over the perimeter of the stator from a 0° angular position to a 180° angular position with the stator enclosed by a second embodiment of the cooling jacket, wherein the channel width remains equal throughout the jacket.

As seen from line 702, the temperature of the stator remains balanced around 95° C. throughout the perimeter (from the 0° angular position to the 180° angular position) of the stator when the cooling jacket of the first embodiment is used. However, as seen from line 704, the temperature of the stator steadily increases (from the 0° angular position to the 180° angular position) of the stator when the cooling jacket of the second embodiment is used. The increased temperature, especially closer to the outlet (located at 180° angular position), may cause hot spots in the stator which may lead of mechanical degradation and reduction is efficiency. The steady increase in temperature of the stator is caused by reduced heat transfer from the stator to the cooling liquid flowing through the cooling jacket. Due to the equal width of the channel, the velocity of the cooling liquid remains unchanged throughout its course while the temperature of the cooling liquid increases from the inlet (located at 0° angular position) to the outlet due to absorption of heat from the stator. At the increased temperature and constant velocity, the heat transfer capability of the cooling liquid is decreased causing an uneven (out of balance) temperature of the stator. In contrast, in the first embodiment, the increase in cooling liquid temperature is compensated by an increase of convective heat transfer due to an increase in cooling liquid velocity over the course of travel from the inlet to the outlet.

Figure 6:
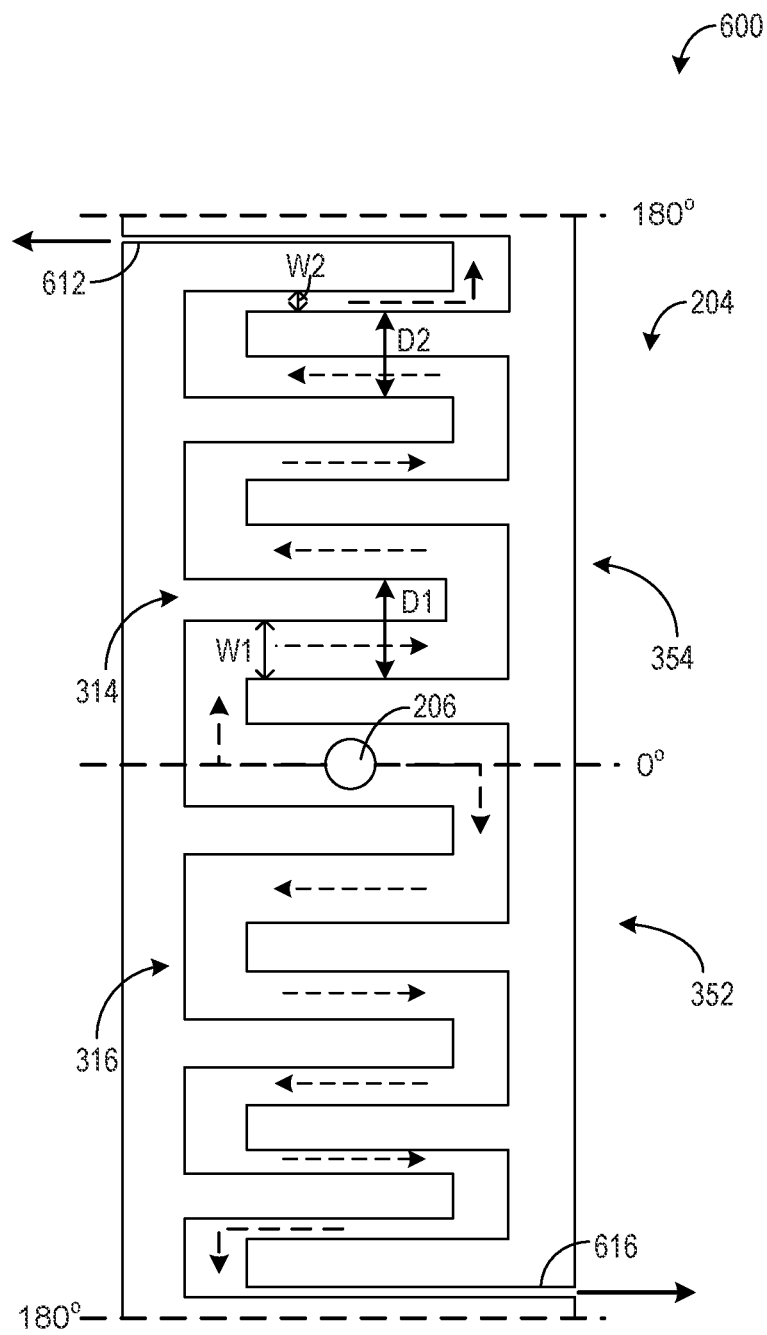
FIG. 6 shows an unwrapped view of the entire cooling jacket.
Figure 7:
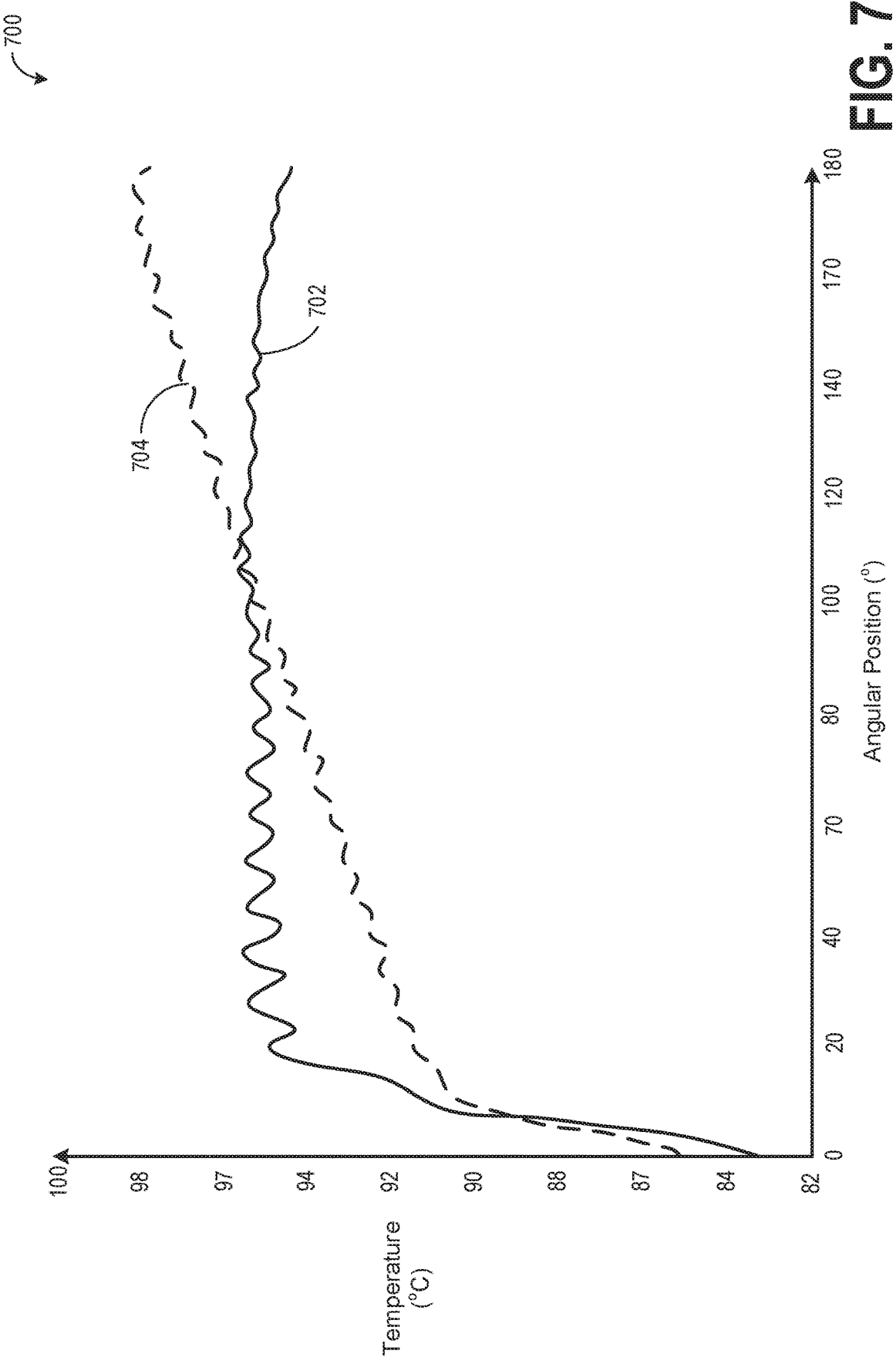
FIG. 7 shows a plot of temperature profiles of cooling jackets of two different embodiments.

FIG. 6 shows an unwrapped view 600 of the entire cooling jacket of FIG. 3A. In the unwrapped view 600 of the cylindrical cooling jacket 204, the 0° angular position corresponds to the center with two 180° angular end positions. The inlet 206 is located at the 0° angular position via which a cooling liquid may enter the continuous cooling channel and as shown by dashed lines originating from the inlet 206, the cooling liquid may be divided into two portions. A first portion of the cooling liquid may travel though segments of the cooling channel in the first half 352 of the cooling jacket 204 and a second portion of the cooling liquid may travel though segments of the cooling channel in the second half 354 of the cooling jacket 204.

The cooling liquid traveling though segments of the cooling channel in the first half 352 of the cooling jacket 204 may exit the cooling jacket via a first outlet 616 while the cooling liquid traveling though segments of the cooling channel in the second half 354 of the cooling jacket 204 may exit the cooling jacket via a second outlet 612. In one example, the first outlet 616 and the second outlet 612 may be a single outlet and the cooling liquid flowing through the first and the second half of the cooling jacket may merge and exit the cooling jacket. In another example, the first outlet 616 and the second outlet 612 may be separate outlets placed adjacent to each other proximal to the 180° angular position.

As previously described, a plurality of interdigitated fingers 314 may project into the serpentine channel 316. The distance between two consecutive fingers decrease from the inlet to an outlet. As shown in this example, D1 is the distance between two consecutive fingers proximal to the inlet 206 and D2 is the distance between two consecutive fingers proximal to the outlet 612, the distance D1 being greater than the distance D2. Due to decrease in distance between fingers, the width of the channel segments may decrease between the inlet 206 and an outlet. As shown in this example, W1 is the width of a channel segment proximal to the inlet 206 and W2 is the width of a channel segment proximal to the outlet 612, the width W1 greater than the width W2.

In this way, system for a cylindrical cooling jacket coaxially surrounding an electric motor comprises an inlet for a cooling liquid, an outlet for the cooling liquid positioned diametrically opposite to the inlet, and a continuous channel disposed on a surface of the cooling jacket with a width of the channel decreasing in multiple increments between the inlet and the outlet in at least one half of the cooling jacket.

In one example, a system for a cooling jacket of an electric motor, comprises: a channel extending along a circumference of an inner surface of the cooling jacket between an inlet and an outlet, a cross-section of the channel gradually changing from the inlet to the outlet along the circumference. In the preceding example, additionally or optionally, the cooling jacket is a cylindrical structure with the inlet being positioned on the circumference of the inner surface of the cooling jacket diametrically opposite to the outlet. In any or all of the preceding examples, additionally or optionally, the outlet is a single orifice or a plurality of adjacent orifices. Any or all of the preceding examples, further comprising, additionally or optionally, a cooling liquid entering the channel via the inlet and flowing out of the channel via the outlet. In any or all of the preceding examples, additionally or optionally, the cooling liquid entering the channel via the inlet bifurcates into two portions and flows along a first half and a second half of the channel and then exits the channel via the outlet, the first half of the channel being a symmetrical image of the second half of the channel about the vertical axis of the electric motor. In any or all of the preceding examples, additionally or optionally, the cross-section of the channel is highest proximal to the inlet and the cross-section of the channel is lowest proximal to the outlet. In any or all of the preceding examples, additionally or optionally, the channel is a single continuous channel meandering about interdigitated fingers disposed on the circumference of the inner surface of cooling jacket. In any or all of the preceding examples, additionally or optionally, the interdigitated fingers include a first set of fingers protruding along the circumference of the inner surface from a first side wall and a second set of fingers protruding along the circumference of the inner surface from a second side wall, opposite to the first side wall. In any or all of the preceding examples, additionally or optionally, a width of the interdigitated fingers gradually increases from the inlet to the outlet with a width of a finger proximal to the inlet being highest and a width of another finger proximal to the outlet being the lowest. In any or all of the preceding examples, additionally or optionally, the inner surface of the cooling jacket is placed around an outer periphery of a stator of the electric motor.

Another system for a cylindrical cooling jacket coaxially surrounding an electric motor comprises: an inlet for a cooling liquid, an outlet for the cooling liquid positioned diametrically opposite to the inlet, and a continuous channel disposed on a surface of the cooling jacket with a width of the channel decreasing in multiple increments between the inlet and the outlet in at least one half of the cooling jacket. The preceding example, further comprising, additionally or optionally, an amount of cooling liquid entering the channel via the inlet, the amount of cooling liquid bifurcating upon entry with a first portion flowing through a first half the cooling jacket and a second portion of the cooling liquid flowing through a second half the cooling jacket. In any or all of the preceding examples, additionally or optionally, each of the first half of the cooling jacket and the second half of the cylindrical cooling jacket has a semi-circular cross section, the first half being a symmetrical image of the second half about the vertical axis of the electric motor. In any or all of the preceding examples, the system further comprising, additionally or optionally, a plurality of interlocking fingers projecting out from side walls of the surface of the cooling jacket, the channel meandering between the interlocking fingers. In any or all of the preceding examples, additionally or optionally, a distance between two adjacent fingers of the plurality of interlocking fingers gradually decreases between the inlet and the outlet in the at least one half of the cooling jacket, the one half being one of the first half and the second half of the cylindrical cooling jacket. In any or all of the preceding examples, additionally or optionally, a width of a first segment of the channel proximal to the inlet is higher than a width of a second segment of the channel proximal to the outlet. In any or all of the preceding examples, additionally or optionally, the surface of the cooling jacket is in face sharing contact with a stator of the electric motor.

In yet another example, cooling system for an electric motor, comprises: a cylindrical cooling jacket including a continuous channel disposed on an inner surface meandering about interdigitated fingers projecting from sidewalls of the inner surface, the channel including a variable cross-section with the cross-section decreasing along each of a first half and a second half of the cooling jacket from a top of the cooling jacket to a bottom of the cooling jacket. In the preceding example, additionally or optionally, a cooling liquid enters the channel from an opening located at the top of the jacket and after flowing through the channel in each of the first half and the second half of the cooling jacket, the cooling liquid exits the channel through one or more openings located at the bottom of the cooling jacket, the top and the bottom of the cooling jacket having an angular separation of 180°. In any or all of the preceding examples, additionally or optionally, the inner surface of the cooling jacket is in face sharing contact with a stator of the electric motor.

FIGS. 2A-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Further, reference axes 299 is included in FIG. 2A-B in order to compare the views and relative orientations described below. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2A-5B are drawn approximately to scale, although other dimensions or relative dimensions may be used.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a cooling jacket of an electric motor having an axis of rotation, comprising:
    a first half of a channel extending along a circumference of an inner surface of the cooling jacket between an inlet and an outlet, a cross-section of the channel gradually changing from the inlet to the outlet along the circumference, wherein the first half of the channel includes only a single continuously winding path that extends axially back and forth along the circumference of said inner surface from the inlet to the outlet;
    wherein the first half of the channel meanders about interdigitated fingers disposed on the circumference of the inner surface of cooling jacket, wherein the interdigitated fingers are axially aligned; and
    wherein a width of the interdigitated fingers gradually decreases from the inlet to the outlet with a width of a finger proximal to the inlet being highest and a width of another finger proximal to the outlet being the lowest.

2. The system of claim 1, wherein the cooling jacket is a cylindrical structure with the inlet being positioned on the circumference of the inner surface of the cooling jacket diametrically opposite to the outlet.

3. The system of claim 1, wherein the outlet is a single orifice or a plurality of adjacent orifices.

4. The system of claim 1, further comprising a cooling liquid entering the first half of the channel via the inlet and flowing out of the channel via the outlet.

5. The system of claim 4, wherein the cooling liquid entering the channel via the inlet bifurcates into two portions and flows along the first half and a second half of the channel and then exits the channel via the outlet, the first half of the channel being a symmetrical image of the second half of the channel about a vertical axis of the electric motor.

6. The system of claim 1, wherein the cross-section of the channel is highest proximal to the inlet and the cross-section of the channel is lowest proximal to the outlet.

7. The system of claim 1, wherein the interdigitated fingers of the first half of the channel include only: a first set of fingers protruding along the circumference of the inner surface and extending axially from a first side wall and a second set of fingers protruding along the circumference of the inner surface and extending axially from a second side wall, opposite to the first side wall.

8. The system of claim 1, wherein the channel is in face sharing contact with the stator.

9. A system for a cylindrical cooling jacket coaxially surrounding an electric motor, comprising:
an inlet for a cooling liquid;
a plurality of outlets for the cooling liquid positioned diametrically opposite to the inlet;
a continuous channel disposed on a surface of the cooling jacket with a width of the channel decreasing in multiple increments between the inlet and the outlet(s) in at least one half of the cooling jacket, an amount of cooling liquid entering the channel via the inlet, the amount of cooling liquid bifurcating upon entry with a first portion flowing through a first half of the cooling jacket and a second portion of the cooling liquid flowing through a second half of the cooling jacket, wherein the continuous channel includes only a first single continuous channel with a first part of the bifurcated liquid and only a second single continuous channel with a remaining part of the bifurcated liquid, each of the single continuous channels having only a single continuously winding path that extends axially back and forth along a circumference of said inner surface; and
a plurality of interlocking fingers projecting out from side walls of the surface of the cooling jacket, the channel meandering between the interlocking fingers;
wherein a distance between two adjacent fingers of the plurality of interlocking fingers gradually decreases between the inlet and the outlet in the at least one half of the cooling jacket, the one half being one of the first half and the second half of the cylindrical cooling jacket.

10. The system of claim 9, wherein each of the first half of the cooling jacket and the second half of the cylindrical cooling jacket has a semi-circular cross section, the first half being a symmetrical image of the second half about a vertical axis of the electric motor.

11. The system of claim 9, wherein a width of a first segment of the channel proximal to the inlet is higher than a width of a second segment of the channel proximal to the outlet.

12. The system of claim 9, wherein the channel is in face sharing contact with a stator.

13. A cooling system for an electric motor, comprising:
a cylindrical cooling jacket including a continuous channel disposed on an inner surface meandering about interdigitated fingers projecting from sidewalls of the inner surface, the channel including a bifurcated path, each half of the bifurcated path being a single continuously winding path that extends axially back and forth along a circumference of said inner surface from an inlet to an outlet with a variable cross-section with the cross-section decreasing along each of a first half and a second half of the cooling jacket from a top of the cooling jacket to a bottom of the cooling jacket;
wherein a distance between two adjacent fingers of the interlocking fingers gradually decreases between the inlet and the outlet in the at least one half of the cooling jacket, the one half being one of the first half and the second half of the cylindrical cooling jacket.

14. The system of claim 13, wherein a cooling liquid enters the channel from the inlet being an opening located at the top of the jacket and after flowing through the channel in each of the first half and the second half of the cooling jacket, the cooling liquid exits the channel through one or more openings located at the bottom of the cooling jacket, the top and the bottom of the cooling jacket having an angular separation of 180°.

15. The system of claim 13, wherein the channel is in face sharing contact with the stator.

* * * * *